Oct. 31, 1961 C. C. BROWN 3,006,412

OUTSIDE PIPE CUTTER

Filed Nov. 10, 1958 6 Sheets-Sheet 1

C.C.BROWN
INVENTOR.

BY [signature]

C. C. BROWN
INVENTOR.

BY

OUTSIDE PIPE CUTTER

Filed Nov. 10, 1958 6 Sheets-Sheet 3

C. C. BROWN
INVENTOR.

BY

C. C. BROWN
INVENTOR.

BY
R. Alexander

Oct. 31, 1961 C. C. BROWN 3,006,412

OUTSIDE PIPE CUTTER

Filed Nov. 10, 1958 6 Sheets-Sheet 5

C.C. BROWN
INVENTOR.

BY

ATTORNEY

Oct. 31, 1961 C. C. BROWN 3,006,412

OUTSIDE PIPE CUTTER

Filed Nov. 10, 1958 6 Sheets-Sheet 6

C.C. BROWN
INVENTOR.

BY

ATTORNEY

United States Patent Office 3,006,412
Patented Oct. 31, 1961

3,006,412
OUTSIDE PIPE CUTTER
Cicero C. Brown, P.O. Box 19236, Houston, Tex.
Filed Nov. 10, 1958, Ser. No. 773,107
12 Claims. (Cl. 166—55.6)

This invention relates to outside pipe cutters.

Among the objects of the present invention is the provision of an improved form of pipe cutter which is faster, easier to operate, and generally improved over earlier and more conventional designs of outside pipe cutters.

The pipe cutters in accordance with the present invention are of the type which employ a screw feed device, operated by rotation of the operating pipe, to feed the cutters against the pipe which is to be severed and removed from a well bore. This type of pipe cutter is generally desirable because of the positive character of the cutter feed which assures a fast and accurate cut. However, more conventional outside pipe cutters of this type are so constructed that when a cut has been completed not only the severed portion of the pipe but also the entire cutting tool and the operating pipe string must be removed from the well in order to reset the cutter elements in preparation for return into the well to make an additional cut. Such removal of the cutting tool and operating pipe is time-consuming, particularly when it is recognized that in order to remove the operating pipe and the tool, as well as the severed section of the pipe, it is necessary to withdraw the operating string from the well by breaking it down into its sections as it is pulled from the well.

Accordingly, it is a principal object of the present invention to provide a cutting tool construction by which the pipe cutting elements may be reset for making another cut without removing the entire operating string from the well. In accordance with this invention, it is only necessary to remove as much of the operating string as may be required to expose the upper end of the severed pipe or "fish" at the surface. Since it will be understood that the severed section of the fish will often be several hundred feet long, the avoidance of the necessity for removing from the well a corresponding length of the operating pipe, as well as the cutting tool itself, will result in substantial savings in time and expense in conducting operations for removing a stuck pipe from the well.

In accordance with the present invention, an improved form of screw feed for the cutters is employed in conjunction with elements engaged with the fish in such manner that the fish, when its upper end is exposed at the surface, may, itself, be used as an operating element for actuating the screw feed so as to retract the cutter elements to the position they must occupy in preparation for a subsequent cutting operation.

Another important object of the present invention is to provide fluid pressure actuated elements for releasably locking relatively rotatable elements of the cutter structure to each other at certain stages of operation of the structure.

A further object is to provide, in an outside pipe cutter, fluid pressure-actuated elements for gripping the section of the stuck pipe which is to be removed.

An additional object is to provide fluid pressure-actuated anchor means in the tool body for gripping the section of the stuck pipe which is to be removed, the anchor means being rotatable with respect to the body, and fluid pressure-actuated clutch means longitudinally movable in the body to clutch the anchor means to the body.

Still another object is to provide a pressure fluid-actuated clutch sleeve for clutching the anchor means to the tool body, the clutch sleeve having slidable sealing engagement with the tool body.

Other and more specific objects and advantages of this invention will become more fully apparent from the following detailed description when read in conjunction with the accompanying drawing which illustrates a useful embodiment in accordance with this invention.

Figure 13:
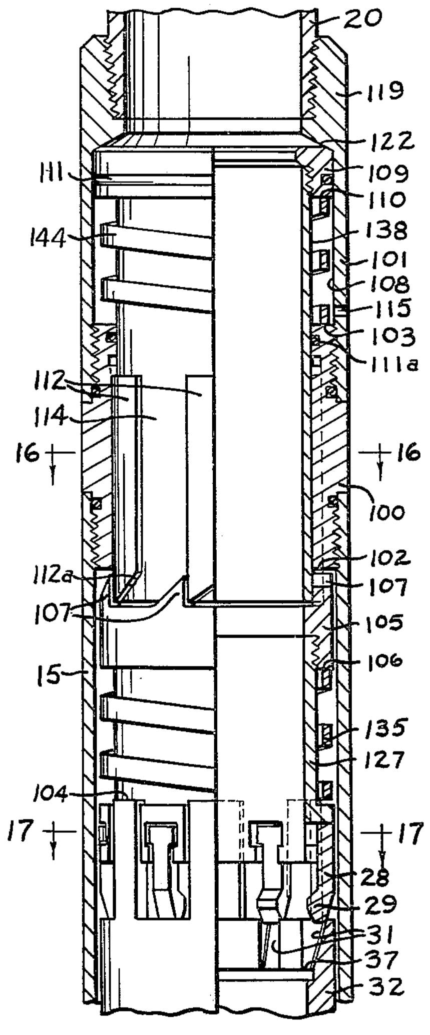
FIG. 13 is a fragmentary partly sectional view of the upper end portion of the tool illustrative of another embodiment of the clutch and anochor elements, the parts being in the positions corresponding to those shown in FIG. 1.
Figure 14:
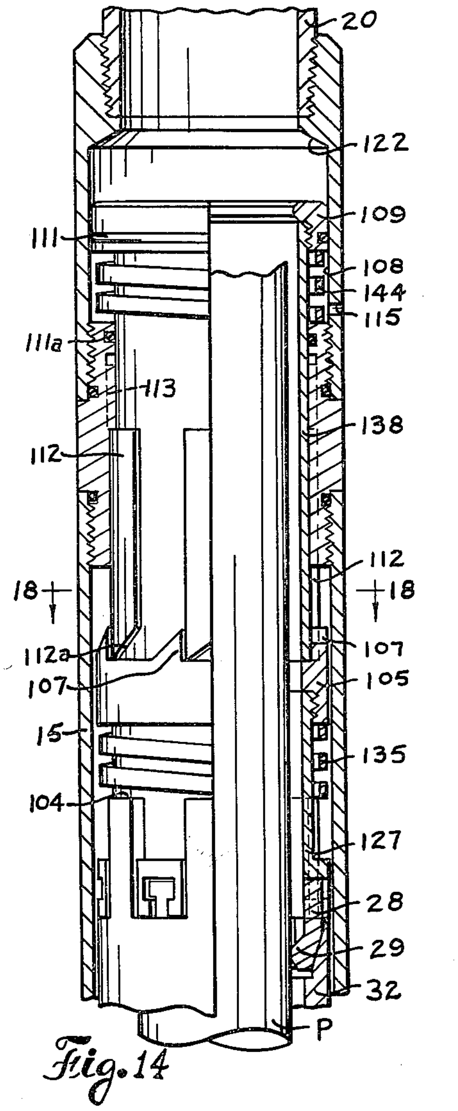
FIG. 14 is a view similar to FIG. 13, the parts being shown in the positions corresponding to those shown in FIG. 2.
Figure 16:
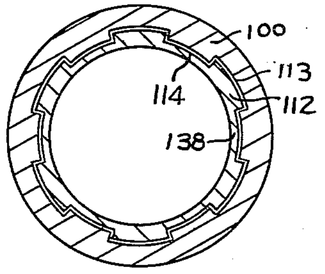
Figure 17:
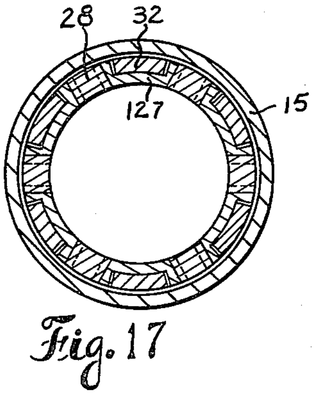
Figure 18:
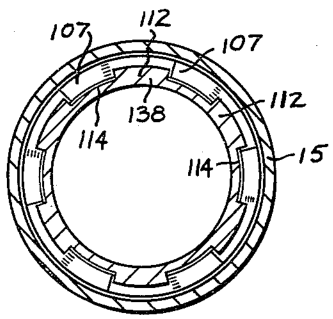

FIGS. 16 and 17 are cross-sectional views taken along lines 16—16 and 17—17, respectively of FIG. 13; and FIG. 18 is a cross-sectional view taken along line 18—18 of FIG. 14.

Figures 6, 7:
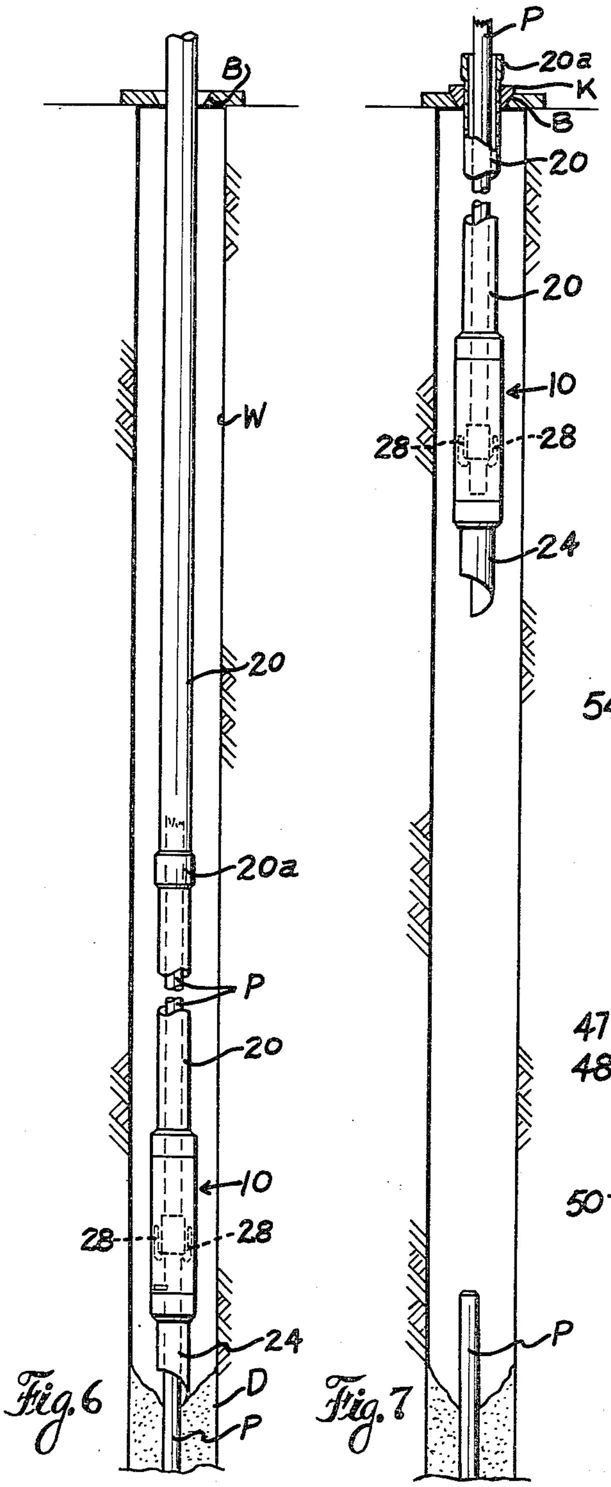
FIG. 6 is a generally diagrammatic view showing the tool positioned in a well bore over the end of a stuck pipe which is to be cut.
FIG. 7 is a view similar to FIG. 6 showing the tool withdrawn from the well to a point at which the upper end of the severed portion of the pipe in exposed at the surface.
Figure 12:
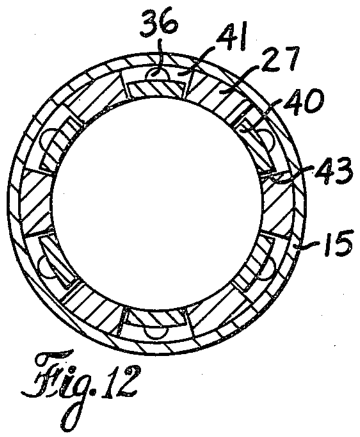
FIG. 12 is a cross-sectional view along line 12—12 of FIG. 1.

Referring to the drawing, the cutting tool includes a tubular body shell, designated generally by the numeral 10, comprising the upper and lower body sections 15 and 16, respectively, threadedly connected at 17. At its upper end, lower body section 16 has an inwardly projecting flange forming an upwardly facing annular shoulder 18, for purposes which will be described hereinafter. The upper end of body section 15 is connected, by means of a coupling member 19, to the operating or wash pipe 20, made up in the usual manner of a plurality of pipe sections coupled together in the usual manner, as best seen in FIG. 6. Coupling member 19 is provided at its lower end with an externally threaded pin 21 which is threadedly received in the bore of the upper end of body section 15 and defines a downwardly facing internal shoulder 22 near the upper end of body section 15. The lower end of lower body section 16 is connected by means of a coupling member 23 to a tubular cutting head or bit 24, as best seen in FIGS. 6 and 7, to enable the lower end of the tool to be extended over, and cut around, the upper end of a stuck pipe P which is to be removed from the well bore. Coupling member 23 is provided with an externally threaded pin member 25 which is threadedly received in the lower end of body section 16, and is provided with a generally cylindrical extension 26 which extends upwardly in the bore of the lower body section and forms the cutter housing of the tool. Slidably mounted in the bore of upper body section 15 is a slip-carrier ring 27, the lower end of which is provided with T-slots 28*a* in which are pendently secured by means of T-heads 28*b* a plurality of circumferentially spaced pipe-engaging slips 28 having their lower ends formed to provide inwardly projecting shoulders or pawls 29 for engaging beneath enlargements on the pipe which is to be cut. At their lower ends, slips 28 are formed to provide inwardly and downwardly tapering faces 30 which are slidably receivable in correspondingly tapered wedge slots 31 formed in a slip bowl 32 mounted in the bore of body section 15. The lower end of slip bowl 32 is supported on shoulder 18 through an interposed roller bearing 33, whereby body 10 may be rotated relative to the slip bowl and its associated elements, as will be subsequently described.

Slip-carrier ring 27 is connected to slip bowl 32 by means of a plurality of vertically disposed guide rods 34 (only one shown). Guide rods 34 extend slidably through appropriate openings in slip-carrier ring 27 and are fastened at their lower ends to the upper end of slip bowl 32, whereby slip-carrier ring 27 may move longitudinally relative to the slip bowl. A coil spring 35 surrounds guide rod 34 and is positioned in compression between slip bowl 32 and slip-carrier ring 27 to normally urge the latter upwardly relative to the slip bowl. The upper end of guide rod 34 carries a head 36 which will limit the upward movement of slip-carrier ring 27. Slots 31 terminate at their lower ends in horizontal shoulders 37 which act as stops to limit the downward movement of slips 28, and also serve as supports for the slips and the load carried thereby.

Figure 1:
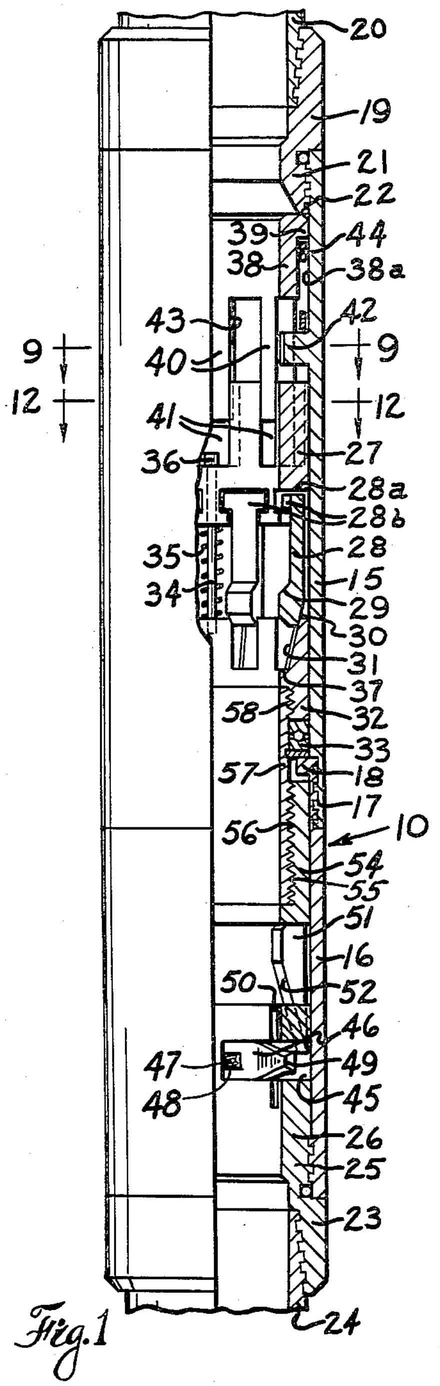
FIG. 1 is a longitudinal quarter-sectional view of the cutting tool, showing the principal parts thereof in the positions occupied when the tool is being lowered into a well bore.

Slidably mounted in upper body section 15, above slip-carrier ring 27, is a clutch sleeve 38, somewhat smaller in external diameter than the bore of body section 15 to provide the annular space 38*a* therebetween. Clutch sleeve 38 has an outwardly turned annular lip 39 at its upper end slidably engageable with the wall of body section 15 and adapted to abut shoulder 22 when sleeve 38 is in its upermost position (FIG. 1). The lower end of sleeve 38 is longitudinally slotted to provide a plurality of spaced apart parallel fingers 40 which are receivable in registering slots 41 formed in the upper end of slip-carrier ring 27. It will be seen that when fingers 40 are received in slots 41, sleeve 38 will be locked to slip-carrier ring 27 in a manner to prevent relative rotational movement between these elements, while permitting relative longitudinal movement therebetween at a point between shoulder 22 and the upper end of slip-carrier ring 27. Upper body section 15 is provided with a plurality of inwardly projecting circumferentially spaced lugs 42 which extend into the spaces 43 provided between the fingers 40, whereby to prevent relative rotation between sleeve 38 and body section 15, while permitting limited longitudinal movement of sleeve 38 relative to body section 15. A strong coil spring 44 is disposed in annular space 38*a* and arranged in compression between lip 39 and the upper ends of lugs 42, spring 44 normally urging sleeve 38 upwardly against shoulder 22 and away from slip-carrier ring 27.

Figure 8:
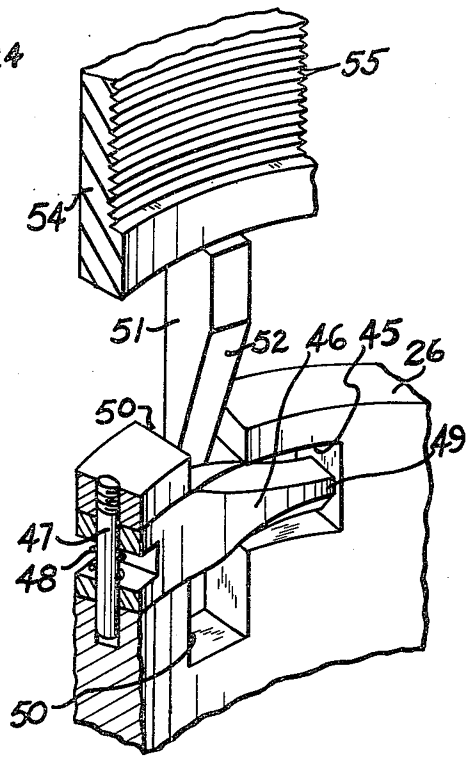
FIG. 8 is a perspective fragmentary view illustrating one of the cutters and feed elements therefor.

As best seen in FIG. 8, cutter housing 26 is provided near its upper end with a plurality of angularly spaced, generally rectangular windows 45, extending through the wall of the housing. A pipe cutter 46 is disposed in each of the windows 45 for horizontally swinging movement therein, cutter 46 being pivoted at one end about a pivot pin 47 vertically disposed between the upper and lower walls of window 45. A coil spring 48 is positioned about pivot pin 47 and is arranged to resiliently urge the free end of the cutter, carrying the cutting point 49, rearwardly in the window 45 away from the bore of housing 26. Each of the windows 45 is intersected by a vertical slot 50, having substantially parallel sides, which extends from the upper end of housing 26 to a point somewhat below the lower wall of window 45. Extending into each of the slots 50 from above and disposed for vertical sliding movement therein is a wedge member 51, of generally flat shape, radially disposed with respect to the axis of the tool. On its inner edge, wedge member 51 has a downwardly and outwardly tapered wedging surface 52 which is adapted to engage the rear face of cutter 46 and to urge the free end of the latter out of window 45 inwardly of the tool in response to downward movement of the wedge member 51. Retraction of the wedge member 51 will, of course, permit cutter 46 to swing outwardly under the force of coil spring 48.

The upper ends of wedges 51 are integral with, or otherwise rigidly secured to, the lower end of a tubular feed bushing 54 which is slidably disposed in the bore of body section 16 below shoulder 18. The bore of feed bushing 54 is provided with threads 55 which engage complementary external threads 56 formed about the lower end portion of a feed sleeve 57 which has its upper end inserted in the bore of the lower end of slip bowl 32 and threadedly secured thereto at 58. The upper end portion of feed sleeve 57, which extends between the lower end of slip bowl 32 and shoulder 18, serves to confine bearing 33.

With the right-hand threaded arrangement of feed bushing 54 with feed sleeve 57, it will be seen that upon rotation of body 10 relative to feed sleeve 57, feed bushing 54 will be caused to move downwardly thereby driving wedge members 51 downwardly in slots 50 behind cutters 46 to cause cutter points 49 to feed inwardly as body 10 is rotated, the wedge members cooperating with slots 50 as a splined connection to prevent relative rotation between feed bushing 54 and cutter housing 26. Moreover, it will be seen that when feed sleeve 57 is rotated in the right-hand direction relative to feed bushing 54, the latter will be retracted and will withdraw wedges 51 from engagement with cutters 46. This operation and its function will be described in greater detail hereinafter.

The cutting tool heretofore described is operated in the following manner: The tool, with the parts in the positions illustrated particularly in FIG. 1, will be connected to operating pipe 20, which is made up of a plurality of pipe sections connected together by conventional couplings 20*a* (FIG. 6), and lowered into the well W through a casinghead, of any conventional form, equipped with a slip bowl B, located at the top of the well. It will be assumed that a string of pipe P has been stuck in the well by some agency, such as by cavings or detritus, indicated at D, and it is the purpose of the tool to remove the stuck pipe by working the tool down over the upper end of the pipe and severing it in successive sections as may be required in order to effect its complete removal, or its removal to whatever extent it may be possible to work the tool down over the stuck pipe or "fish." Cutting head or bit 24 is of hollow form adapted to pass over the upper end of the stuck pipe and guide the latter into the bore of the tool and to cut away the detritus D from about the stuck pipe.

As seen in FIG. 1, the parts of the tool are in their relatively retracted relationship; that is, clutch sleeve 38 will be at its uppermost position against shoulder 22 under the expansive force of coil spring 44. Slip-carrier ring 27 will likewise be urged to its uppermost position relative to slip bowl 32 by the force of coil springs 35. When clutch sleeve 38 and slip-carrier ring 27 are in these uppermost positions, the lower ends of clutch fingers 40 will extend into slots 41 in the slip-carrier ring and thereby lock clutch sleeve 38 to the slip-carrier ring against relative rotation while permitting relative longitudinal movement between these parts. The elevation of slip-carrier ring 27 to its uppermost position will, of course, carry pawls 29 to their uppermost position in guide slots 31 and will thereby retract the pawls to a position inside of, or approximately flush with the bore of slip bowl 32. Feed bushing 54 will be in its fully retracted position relative to feed sleeve 57, thereby holding wedge members 51 in their fully retracted position where they will be out of engagement with cutters 46, and the latter will thereby be disposed in their retracted positions in windows 45 under the force of coil springs 48.

With the parts in the positions shown in FIG. 1 and as described above, it will be seen that body 10 will be locked to clutch sleeve 38 through the engagement of lugs 42 in slots 43 and thence to slip-carrier ring 27, and through rods 34 with slip bowl 32. As the lower end of body 10 is directly secured to cutter housing 26 through threads 25 and thence, through the engagement of wedge members 51 in slots 50, to feed bushing 54, the latter being threadedly connected to feed sleeve 57 which is secured directly to slip bowl 32, it will be seen that rotation of operating pipe 20 will rotate the entire tool structure, including cutter head 24, as the tool is lowered in the well and fed over the upper end of pipe P. All of the parts interiorly of body 10 will, therefore, be held against rotation relative to the body and the operating pipe. Washing fluid may be circulated down through pipe 20 and the bore of the tool while the tool is being worked down over the upper end of the fish. As all of the relatively movable parts are thus secured together, the entire tool may be freely rotated in working it over the fish without danger of actuating the cutter knives.

Figure 2:
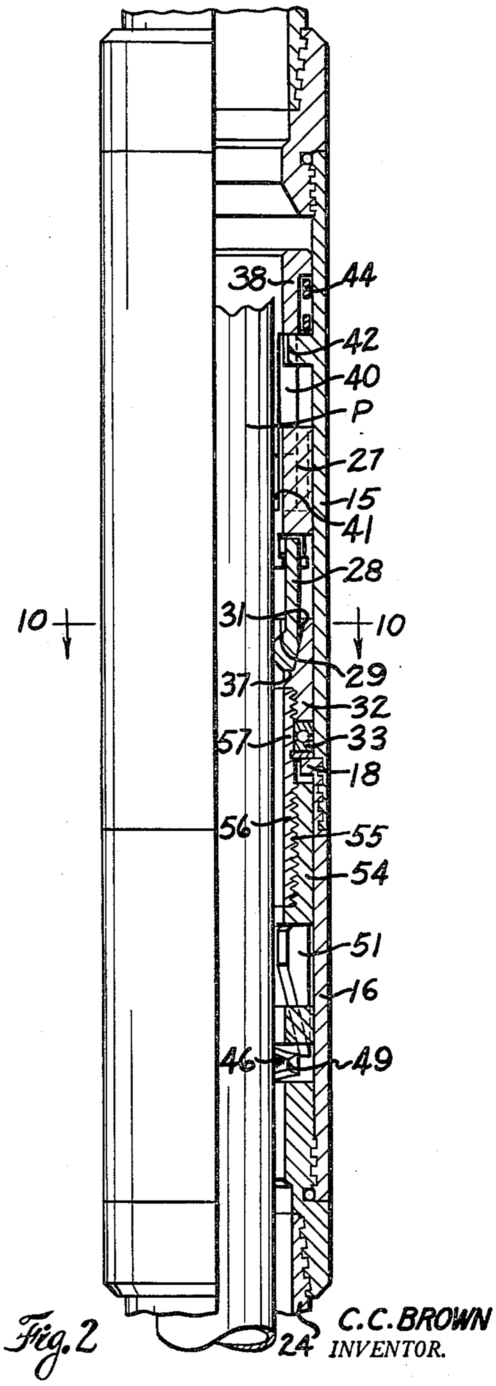
FIGS. 2, 3 and 4 are views similar to FIG. 1, illustrating various positions of the tool parts when engaging and cutting a section of a pipe string which is to be removed from the well.

As soon as the upper end of pipe P has been worked up into the bore of the tool to a point above or opposite slip-carrier ring 27 (FIG. 2), the bore of the tool will be restricted to the annular clearance between the exterior of pipe P and the walls of the tool parts positioned within body 10. As the wash fluid continues to be circulated, the resulting restriction upon its flow will cause the fluid to exert a pressure against the upper end of slip-carrier ring 27 and will urge the latter downwardly relative to slip bowl 32 which is fixed against vertical movement by its seating, through bearing 33, upon shoulder 18. This downward movement of the slip-carrier ring 27 relative to slip bowl 32 will move slips 28 downwardly in wedge slots 31 and thereby urge them in toward the exterior of pipe P. The downward movement of slips 28 will be limited by engagement of the lower ends of the slips with shoulders 37. At the same time, the fluid pressure will be exerted against the upper end of clutch sleeve 38 which will be forced downwardly against the resistance of coil spring 44 until the upper ends of slots 43 abut lugs 42. This downward movement of the clutch sleeve, occurring along with the downward movement of slip-carrier ring 27, will retain clutch fingers 40 in latching engagement in slots 41 of the slip-carrier ring (FIG. 2).

Figure 3:
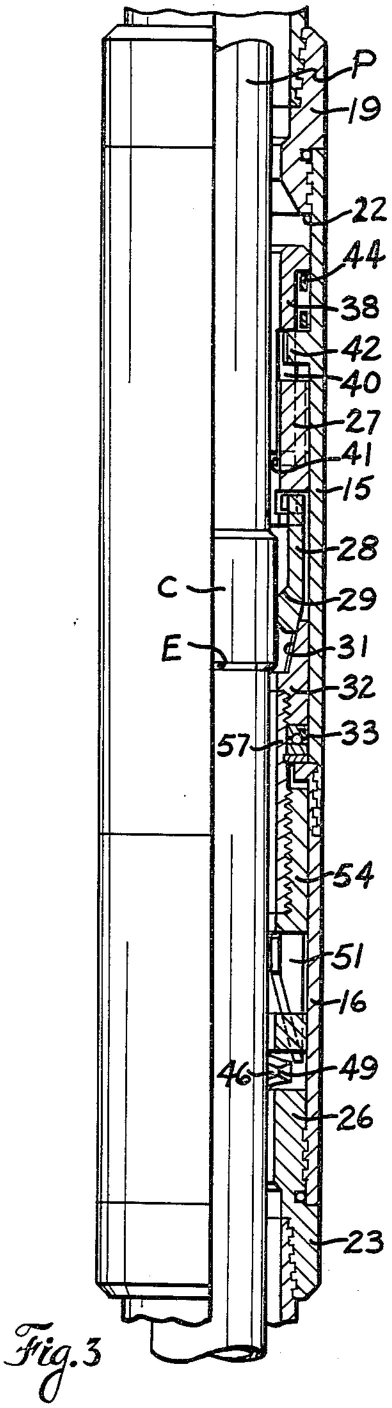

The downward movement of the tool over pipe P is thus continued while the fluid pressure is maintained in the tool, as described, until the tool has been worked down over as much of pipe P as conditions in the well permit, the tool, of course, being rotated as it is worked down. While moving downwardly over pipe P, one or more collars C, connecting sections of pipe P, will be encountered. These collars will provide enlargements E over which the tool will pass. It will be seen that in moving downwardly, as the lower ends of slips 28 engage the upper end of a collar C, the latter will force the slips upwardly and outwardly along slots 31 in the slip bowl in order to allow the enlargements to pass the slips. FIG. 3 illustrates the position of such a coupling relative to the slips at an intermediate point in the passage of the collar by the slips. When collar C has passed pawls 39 at the lower ends of the slips, the fluid pressure, acting on the slip-carrier ring, will again move the slips downwardly so that pawls 29 will move inwardly below enlargement E at the lower end of collar C, and will again seat on shoulders 37 (FIG. 4).

Figure 4:
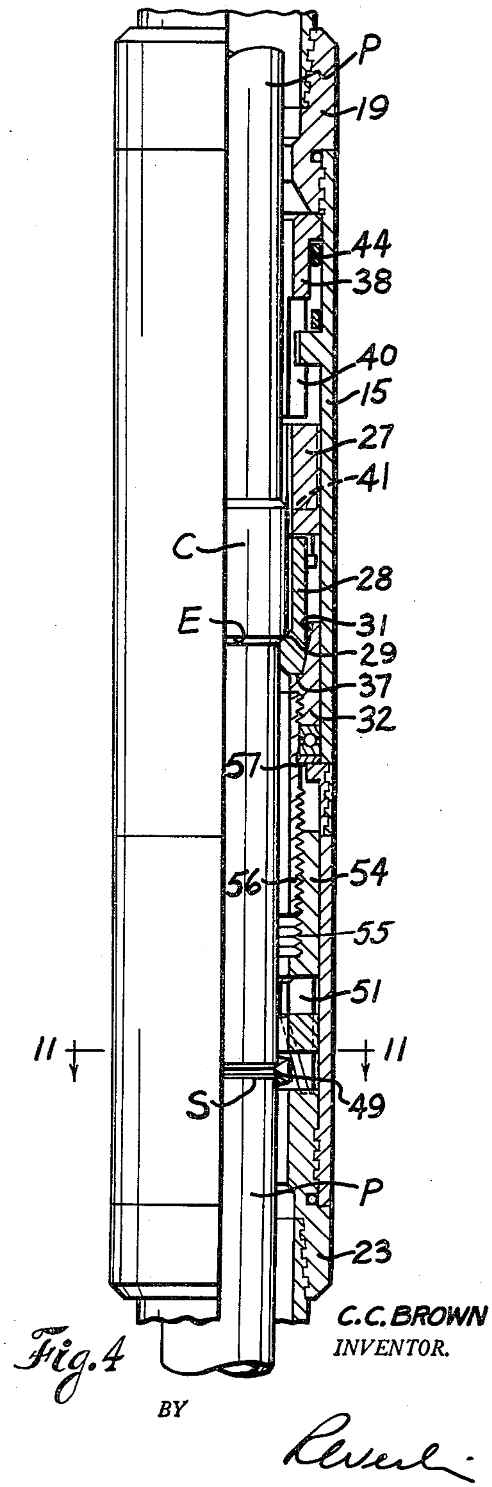

Assuming that collar C, shown in FIG. 4, is the last collar positioned above the point at which a cut is to be made, the tool will now be prepared for performing the cutting operation. An upward pull will be taken on operating pipe 20 sufficient to assure that the weight of the fish above collar C is placed on the slips to thereby hold the slips in their downward position in slip bowl 32. The fluid pressure in the bore of the tool will be relieved and this will allow clutch sleeve 38 to move upwardly under the urging of spring 44 to its uppermost position against shoulder 22, as seen in FIG. 4. Slip-carrier ring 27, however, cannot move upwardly because of the weight of the fish which has been placed on pawls 29 and it will, therefore, be held in its lowermost position. As a result of this separation between slip-carrier ring 27 and clutch sleeve 38, clutch fingers 40 will be pulled out of slots 41 in the slip-carrier ring and will thereby release body 10 for rotation relative to the slip-carrier ring and its connected elements.

With clutch sleeve 38 thus retracted, rotation of operating pipe 20 will be transmitted through body 10 to cutter housing 26, while slip-carrier ring 27, slips 28, slip bowl 32, and feed sleeve 57 are held stationary by the weight of pipe P on the slips, the rotation of the body relative to these parts occurring through bearing 33. As rotation of body 10 is continued, feed bushing 54 will be caused to rotate with the body and the cutter housing relative to feed sleeve 57, which, as noted, will be stationary. This rotation of feed bushing 54 relative to feed sleeve 57 will thereupon cause feed bushing 54 to move downwardly relative to feed sleeve 57 inside lower body section 16, as best seen in FIG. 4, and this downward movement of feed bushing 54 will drive wedge members 51 downwardly behind the cutters 46 and urge cutter points 49 inwardly against pipe P, causing the cutter points to make a circular cut S in pipe P as the cutter head is rotated about pipe P. Since the downward movement occurs by reason of the screw connection between feed bushing 54 and feed sleeve 57, it will be seen that each rotation of the cutter housing relative to the feed sleeve will, through the wedging action of wedge members 51 on the back faces of cutters 46, continuously feed the cutter points radially inwardly as the rotation continues, and thereby, upon completion of a sufficient number of rotations, will cause the cutter points 49 to cut through the wall of pipe P and complete the severing of the pipe along cut S.

When a section of pipe P has been severed, as above described, the operating pipe will be drawn upwardly from the well and the sections thereof will be broken out at the surface in the conventional manner as the cutting tool and the severed portion of pipe P are drawn upwardly with the operating pipe. As collar C continues to rest on the slips 28, upward movement of the operating string will, of course, carry the severed portion of the pipe upwardly. As seen in FIG. 7, operating pipe 20 will be held in slips K, seated in slip bowl B, in a conventional manner, while the successively withdrawn sections of the operating string are broken out. The sections of the operating string will be broken out successively until the upper end of pipe P will be exposed above the top of the well head. At this point, of course, the cutting tool and a length of the operating string corresponding in length to the severed portion of the pipe P will remain in the well. This length of operating string may, in many cases, be several hundred feet.

Figure 5:
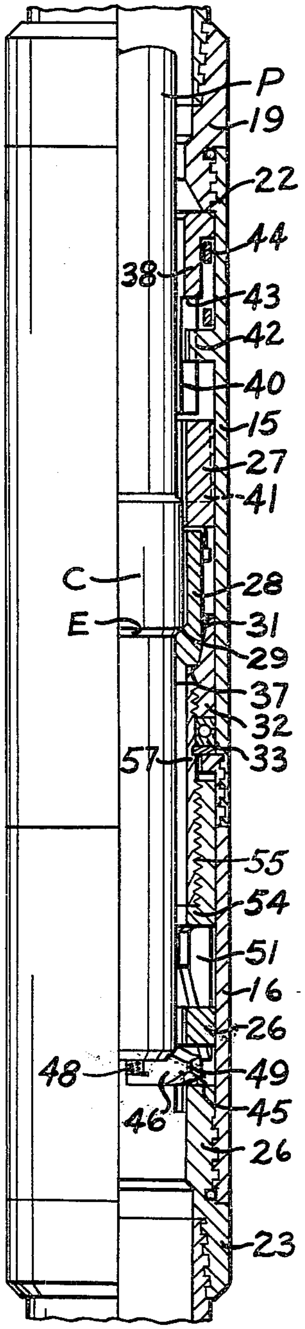
FIG. 5 is a view similar to the preceding figures, but showing the cutting elements retracted in position for making another cut before the severed portion of the pipe has been removed from the tool.
Figure 9:
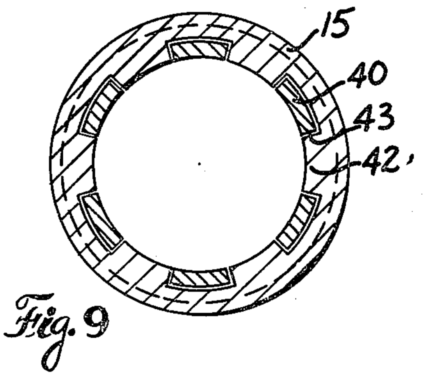
FIG. 9 is a cross-sectional view along line 9—9 of FIG. 1.
Figure 10:
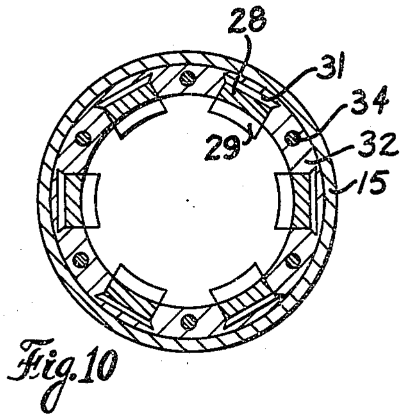
FIG. 10 is a cross-sectional view along line 10—10 of FIG. 2.
Figure 11:
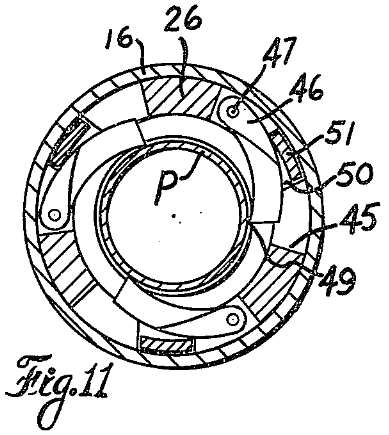
FIG. 11 is a cross-sectional view along line 11—11 of FIG. 4.

When the upper end of the severed pipe section P has been exposed at the top of the well, as described, wrenches may be applied thereto and the severed section will be rotated to the right. As the weight of the severed section is still supported on the slips in the body of the tool, sufficient friction will exist between collar C and the slips to cause the right-hand rotation of the severed section of pipe to be transmitted through the slips and slip bowl 32 to feed sleeve 57, and these parts will be caused to rotate relative to body 10 and feed bushing 54. The rotation of feed sleeve 57 relative to feed bushing 54, in this manner, will cause the latter to retract relative to feed sleeve 57 and thereby retract wedge members 51 from their engagement with cutters 46, whereupon the latter will be forced outwardly away from engagement with pipe P by the force of coil springs 48 (FIG. 5) sufficiently to permit the entrance of a new section of the pipe P through the bore of the tool, while being disposed in position to begin another cut when such new section of pipe P has been fed into the tool.

When cutters 46 have thus been retracted, the severed portion of pipe P may be withdrawn from the bore of the portion of the operating string which has been permitted to remain in the well, and the cutting tool may now be lowered again into the well bore to make another cut on the remaining portion of pipe P without having had to withdraw from the well the cutting tool and that portion of the operating pipe corresponding to the length of the severed portion of the fish. By thus avoiding the necessity for removing the cutting tool and the described length of operating pipe from the well, it will be seen that a very substantial savings in time of operation and in cost will be effected with the tool heretofore described.

The fluid actuated clutch and slip-carrier elements provide additional advantages in speed of operation and in reducing the amount of manipulation required with more conventional types of tools.

The embodiment illustrated in FIGS. 13 to 18 provides a modification of the clutch and anchor elements of the previously described device which is particularly effective under numerous conditions encountered in operation.

It is found frequently that as a collar is passing through the slip bowl, as illustrated, for example, in FIG. 3, greater fluid flow constriction may be momentarily created between the collar and the bore of the slip bowl than that which will exist at the same time between the exterior of pipe P and the bore wall of clutch sleeve 38. The back pressure produced by this greater constriction at the slip bowl may cause the pressure on the clutch sleeve to be relieved sufficiently to permit the pressure of spring 44 to retract the clutch sleeve from its engagement with the slip-carrier ring, whereupon continued rotation of the operating pipe would actuate the cutters to cut the pipe at an undesired point thereon.

The modification illustrated in FIGS. 13–18 obviates this possible deficiency in the previously described embodiment by assuring that sufficient differential pressure will exist across the clutch sleeve to maintain it in positive clutching engagement with the anchor elements so long as fluid is being pumped through the bore of the tool. In this modification, since only the slip-carrier ring and clutch elements of the cutting tool are modified, all other parts of the entire tool being identical in form and operation with the corresponding parts of the first-described embodiment, only the modified elements and their operation will be described.

Referring to FIGS. 13 to 18, upper body section 15 is threadedly connected to the lower end of a connector bushing 100, the upper end of which is threadedly connected to a skirt 101 which forms the lower end of a coupling 119 by which the tool is secured to operating pipe 20. The bore of bushing 100 is made smaller than the bore of body section 15 and that of skirt 101, thereby defining at its lower end a downwardly facing shoulder 102 and at its upper end an upwardly facing shoulder 103 interiorly of body section 15 and skirt 101, respectively. The bore of skirt 101 is larger than that of coupling 119, thereby defining a downwardly facing shoulder 122 in the bore of skirt 101 which is longitudinally spaced above shoulder 103. A slip-carrier ring 127 is mounted in the bore of body section 15 and supports at its lower end the slips 28 in the same relation to bowl 32 as in the previously described modification. The exterior of slip-carrier ring 127 is made smaller in diameter than the upper end of slip bowl 32 and is slidably received therein, whereby the upper end of slip bowl 32 will define an upwardly facing annular shoulder 104 extending between ring 127 and the wall of body section 15. At its upper end slip-carrier ring 127 is threadedly received in a collar 105, the lower end of which forms a downwardly facing shoulder 106 spaced from shoulder 104. A coil spring 135 surrounds slip-carrier ring 127 and is arranged in compression between shoulders 104 and 106 to thereby normally urge the slip-carrier ring upwardly with respect to slip bowl 32 in order to hold the slips 28 in their radially retracted positions.

Figure 15:
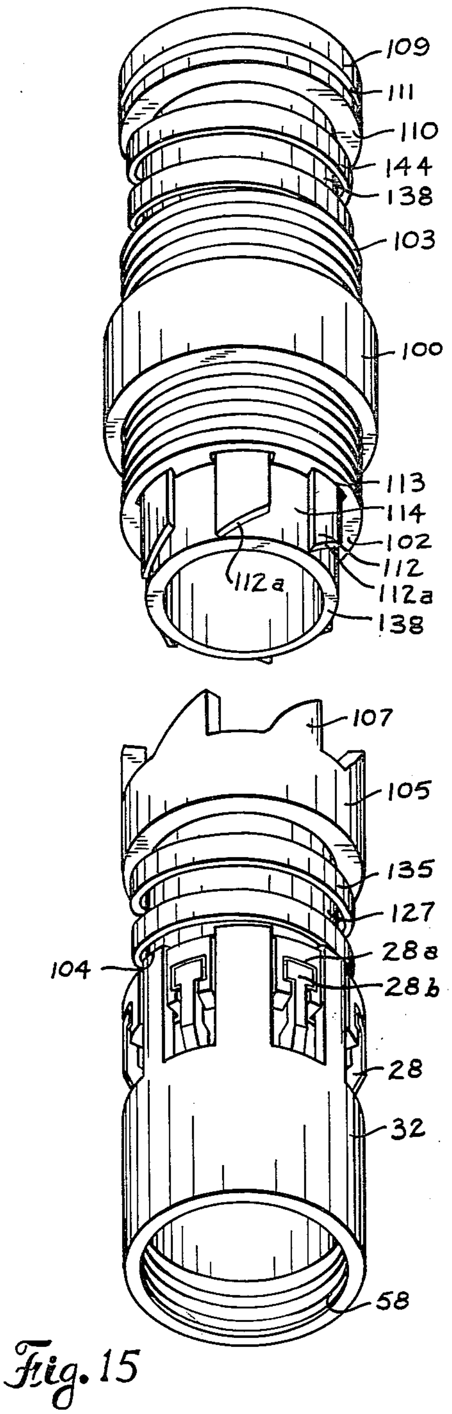
FIG. 15 is a perspective elevational view of the modified clutch and anchor elements, the clutch elements being shown fully separated for purposes of illustration.

The upper end of collar 105 is provided with a plurality of circumferentially spaced upwardy projecting clutch teeth 107 (see particularly FIG. 15). A tubular clutch sleeve 138 is slidably mounted in the bore of bushing 100, being smaller in diameter than the bore of skirt 101, thereby providing an annular space 108 between clutch sleeve 138 and skirt 101. The upper end of clutch sleeve 138 is threadedly received in the bore of an annular cap 109, the lower end of which forms a downwardly facing annular shoulder 110 longitudinally spaced above shoulder 103 in space 108. A coil spring 144 surrounds clutch sleeve 138 in space 108 and is mounted in compression between shoulders 103 and 110, whereby to normally urge the clutch sleeve upwardly toward shoulder 122 which forms a limit stop for the upper end of the clutch sleeve. An O-ring seal 111 is mounted circumferentially in the outer periphery of cap 109 to form a fluid-tight slidable seal between the upper end of sleeve 138 and the wall of skirt 101.

Another O-ring seal 111*a* is disposed circumferentially between bushing 100 and the exterior of clutch sleeve 138 to form a slidable fluid-tight seal therebetween. Seals 111 and 111*a* thus effectively seal off space 108 from communication with the bore of the tool. One or more openings 115 are provided through the wall of skirt 101 for establishing communication between space 108 and the exterior of the tool.

The exterior of clutch sleeve 138 has formed thereon about its lower end portion a plurality of angularly spaced longitudinally extending clutch splines 112 which are slidable longitudinally in correspondingy shaped female spline grooves 113 provided in the bore wall of bushing 100 and extending downwardly therethrough from a point below seal 111*a* (see FIG. 16). The spline connection thus provided will permit clutch sleeve 138 to move longitudinally with respect to body 10 while preventing relative rotation therebetween. The lower ends of clutch splines 112 are adapted to enter the spaces between and to form teeth 112*a* which engage clutch teeth 107 on the upper end of collar 105 in response to downward movement of the clutch sleeve relative to collar 105. Teeth 107 will, at the same time, enter the spaces 114 between clutch teeth 112*a*.

Operation of the clutch elements is very much the same as in the case of the previously described embodiment. When the tool is initially run into the well the clutch parts and the anchor elements will be in the relative positions illustrated in FIG. 13, wherein clutch sleeve 138 will be retracted under the force of spring 144 to its uppermost position. At the same time spring 135 will be holding the slip-carrier ring 127 and collar 105 in their uppermost position at which clutch teeth 107 will be engaged with teeth 112*a*, thereby locking the slip-carrier ring and slip bowl to body section 15 for rotation therewith as the string of tools is lowered into the well.

When the tool has been worked over the end of pipe P, as seen in FIG. 14, washing fluid being pumped through the tool, the constrictions to fluid flow through the bore of the tool, created by entrance of the pipe into the bores of slip-carrier ring 127 and clutch sleeve 138, will cause resultant fluid pressure to produce downward compression both on slip-carrier ring 127 and clutch sleeve 138. Downward movement of slip-carrier ring 127 relative to slip bowl 32 will cause slips 28 to be urged inwardly by their engagement with the inwardly tapered slots 31 while clutch sleeve 138 will be maintained in clutching engagement with the slip-carrier ring by reason of the fluid pressure exerted thereon. By providing the sealed space 108 vented through opening 115 to the exterior of the tool, a positive pressure differential will be maintained at all times across clutch sleeve 138 so long as pressure fluid is being pumped through the bore of the tool. This pressure differential will be greater than that across the slip-carrier ring and the slip bowl and will always assure that the clutch sleeve and clutch collar 105 will be maintained in engagement, irrespective of the constrictions which may occur between pipe P and slip-carrier ring 127 and slip bowl 32. This arrangement will eliminate the danger that clutch sleeve 138 may be released from engagement with collar 105 and its connected anchor elements during the operation of working the body of the washover tool over the fish to the maximum extent desired.

When the slips have been worked past the lowermost collar C adjacent the point at which a cut is to be made, as illustrated in FIG. 4, the hydraulic pressure in the bore of the tool will be relieved. As previously described, this will allow clutch sleeve 138 to be retracted by spring 144 while slip-carrier ring 127 and collar 105 are held in their fully seated position in slip bowl 32 beneath collar C, and thus clutch teeth **112*a* and sleeve 138 will be retracted completely out of engagement with teeth 107 on collar 105, thereby permitting rotation of the body 10** and the cutting elements carried thereby relative to the anchor elements, in order to accomplish the severing of the pipe, in the same manner as previously described.

It will be understood that various alterations and modifications may be made in the details of the illustrative embodiment within the scope of the appended claims, but without departing from the spirit of the invention.

What I claim and desire to secure by Letters Patent is:

1. In an outside pipe cutter, a tubular body adapted to receive a pipe to be cut, anchor means slidably mounted in the body for rotation relative thereto and operable by fluid pressure in the body for releasably engaging the pipe, cutter means rotatable with the body for severing the pipe while the latter is engaged by the anchor means, and clutch means movably mounted in the body, said clutch means including an annular piston portion and operable by fluid presure in said body acting on said piston portion to clutch said anchor means to said body for rotation therewith while said body is being worked down over said pipe.

2. An outside pipe cutter according to claim 1 having a tubular bit secured to the end of the body passed over said pipe.

3. In an outside pipe cutter, a tubular body adapted to receive a pipe to be cut, anchor means for releasably engaging said pipe slidably mounted on the body for rotation relative thereto, fluid pressure actuated clutch means movably mounted in the body to clutch said anchor means to the body for rotation therewith, inwardly movable cutter knives on the body, means resiliently biasing said knives outwardly to inactive position, knife-actuating means including a feed sleeve fixed to the anchor means, a feed member carried by the body and a screw feed connection from said feed member to said feed sleeve, said feed member being rotatable with said body relative to said feed sleeve while said anchor means is engaged with said pipe, wedge members rigidly secured to the feed member and movable therewith in response to rotation of said feed member relative to the feed sleeve to urge said knives inwardly into cutting engagement with said pipe to sever the same, and said feed member and said wedge member being retractible through said screw feed connection by rotation of the severed portion of said pipe relative to the body while said anchor means is engaged with said portion of the pipe whereby to release the knives for movement to said inactive position.

4. In an outside pipe cutter, a tubular body adapted to receive a pipe to be cut, anchor means slidably mounted in the body for engagement with said pipe and rotatable relative to said body, fluid presure-actuated movable clutch means mounted in the body for releasably clutching the body to said anchor means against relative rotation therebetween, inwardly movable cutter knives on the body resiliently biased outwardly to inactive position, knife-actuating means carried by the body, a reversible screw feed connection from said knife-actuating means to said anchor means, said knife-actuating means being rotatable with said body relative to the anchor means while the latter is engaged with said pipe and operable through said screw feed connection for urging said knives inwardly into cutting engagement with said pipe to sever the same, said screw feed connection being operable by rotation of the severed portion of said pipe relative to the body while the anchor means is engaged with said severed portion to retract said knife-actuating means to release said knives for movement to said inactive position.

5. In an outside pipe cutter, a tubular body adapted to receive a pipe to be cut, anchor means slidably mounted in said body for rotation relative thereto and operable by fluid pressure in the body for releasably engaging said pipe, clutch means movably mounted in the body operable by said fluid pressure to secure said anchor means to the body for rotation therewith, said clutch means being releasable from said anchor means when the latter is engaged with said pipe, inwardly movable cutter knives on the body, means resiliently biasing said knives outwardly to inactive position, knife-actuating means carried by the body a reversible screw feed connection from said knife-actuating means to said anchor means, said knife-actuating means being rotatable with said body relative to said anchor means while the latter is engaged with said pipe and operable through said screw feed connection for urging said knives inwardly into cutting engagement with said pipe to sever the same, said screw feed connection being operable by rotation of the severed portion of the pipe relative to said body while the anchor means is engaged with said severed porition to retract said knife-actuating means to release said knives for movement to said inactive position.

6. In an outside pipe cutter, a tubular body adapted to receive a pipe to be cut, anchor means for engaging said pipe mounted in the body for rotation relative thereto, cutter means rotatable with the body for severing the pipe while the latter is engaged by the anchor means, and clutch means comprising a generally tubular sleeve member slidably but non-rotatably mounted in the body for movement longitudinally of the body into and out of clutching engagement with said anchor means, said sleeve member including an annular piston portion operable by fluid pressure in the body acting on said piston portion to clutch said anchor means to said body for rotation therewith while said body is being worked down over said pipe.

7. In an outside pipe cutter, a tubular body adapted to receive a pipe to be cut, anchor means for engaging said pipe mounted in the body for rotation relative thereto, cutter means rotatable with the body for severing the pipe while the latter is engaged by the anchor means, clutch means comprising a generally tubular sleeve member slidably but non-rotatably mounted in the body for movement longitudinally of the body into and out of clutching engagement with said anchor means, said sleeve member including an annular piston portion operable by fluid pressure in the body acting on said piston portion to clutch said anchor means to said body for rotation therewith while said body is being worked down over said pipe, and means resiliently urging said sleeve member out of clutching engagement with said anchor means.

8. In an outside pipe cutter, a tubular body adapted to receive a pipe to be cut, anchor means for engaging said pipe mounted in the body for rotation relative thereto, cutter means rotatable with the body for severing the pipe while the latter is engaged by the anchor means, clutch means comprising a generally tubular sleeve member slidably but non-rotatably mounted in the body for movement longitudinally of the body into and out of clutching engagement with said anchor means, longitudinally spaced annular seals disposed between the sleeve member and the body, and port means through the wall of the body communicating with the space between said seals, said sleeve member including an annular piston portion operable by fluid pressure in the body acting on said piston portion to clutch said anchor means to said body for rotation therewith while said body is being worked down over said pipe.

9. In an outside pipe cutter, a tubular body adapted to receive a pipe to be cut, anchor means for engaging said pipe mounted in the body for rotation relative thereto, cutter means rotatable with the body for severing the pipe while the latter is engaged by the anchor means, clutch means comprising a generally tubular sleeve member slidably but non-rotatably mounted in the body for movement longitudinally of the body into and out of clutching engagement with said anchor means, longitudinally spaced annular seals disposed between the sleeve member and the body, port means through the wall of the body communicating with the space between said seals, said sleeve member including an annular piston portion operable by fluid pressure in the body acting on said portion to clutch said anchor means to said body for rotation therewith while said body is being worked down over said pipe, and means resiliently urging said sleeve member out of clutching engagement with said anchor means.

10. In an outside pipe cutter, a tubular body adapted to receive a pipe to be cut, anchor means for engaging said pipe mounted in the body for rotation relative thereto, said anchor means being operable by fluid pressure in the body to engage said pipe, cutter means rotatable with the body for severing the pipe while the latter is engaged by the anchor means, clutch means comprising a generally tubular sleeve member slidably but non-rotatably mounted in the body for movement longitudinally of the body into and out of clutching engagement with said anchor means, said sleeve member including an annular piston portion operable by said fluid pressure in the body acting on said piston portion to clutch said anchor means to said body for rotation therewith while said body is being worked down over said pipe, and the sleeve member and the body having means constructed and arranged to produce a greater differential pressure of said fluid across said sleeve member than across said anchor means while said pipe extends through said body.

11. An outside pipe cutter according to claim 10 wherein said means carried by the sleeve member and the body comprises longitudinally spaced circumferential seals between the sleeve member and the body, and openings through the wall of the body communicating with the space between said seals.

12. In an outside pipe cutter, a tubular body adapted to receive a pipe to be cut, anchor means for engaging said pipe mounted in the body for rotation relative thereto, said anchor means comprising an annular slip bowl having inwardly and downwardly tapering surfaces, a slip-carrier ring positioned above the slip bowl for longitudinal reciprocating movement relative thereto, radially movable slips supported from said ring and cooperating with said surfaces for retractible engagement with said pipe in response to said reciprocating movement of said carrier ring, cutter means rotatable with the body for severing the pipe while the latter is engaged by the anchor means, clutch means comprising a generally tubular sleeve member slidably but non-rotatably mounted in the body for movement into and out of clutching engagement with said anchor means, longitudinally spaced annular seals disposed between the sleeve member and the body, port means through the wall of the body communicating with the space between said seals, said slip-carrier ring having a surface adapted to be acted upon by fluid pressure in the body to cause said slips to engage the pipe, and said sleeve member including an annular piston portion operable by said fluid pressure acting thereon to clutch said anchor means to said body for rotation therewith while said body is being worked down over said pipe.

References Cited in the file of this patent

UNITED STATES PATENTS

| | | |
|---|---|---|
| 1,910,637 | Reed | May 23, 1933 |
| 2,132,645 | Reed | Oct. 11, 1938 |
| 2,213,049 | Reed | Aug. 27, 1940 |
| 2,398,981 | Waggener | Apr. 23, 1946 |
| 2,418,278 | Reed | Apr. 1, 1947 |
| 2,651,362 | Storm | Sept. 8, 1953 |